Patented May 8, 1945

2,375,624

UNITED STATES PATENT OFFICE 2,375,624

HALOGENATED COMPOSITION

Frank M. Clark, Pittsfield, Mass., assignor to General Electric Company, a corporation of New York No Drawing. Application July 29, 1942, Serial No. 452,802

6 Claims. (Cl. 252—66)

One aspect of the present invention comprises improved halogenated hydrocarbon compositions which normally are liquid and upon sustained exposure to temperatures as low as —25° C. will not congeal even to the extent of having solid crystalline precipitates form therein.

Another aspect of my invention comprises compositions which normally are soft, deformable solids having such good adhesive properties that they stick to smooth surfaces with great tenacity and having such high degree of cohesiveness that cracks and cavities do not tend to form therein.

Compositions embodying my invention are useful as insulating agents in electric devices, for example, in transformers, capacitors, junction boxes, bushings, fuses and other devices in which liquid or semi-solid materials may be employed. In such devices even partial congelation of an insulating or dielectric material may interfere seriously with the operation of the device and even may render it inoperative. In some cases the formation of crystals occur only when liquid compositions have been subjected for a number of days to extremely low temperature. This phenomenon may be termed long-time crystal formation.

My invention includes a method of treating liquid chlorinated compositions which are subject to congelation with a congelation depressor consisting of chlorinated diphenyl oxide, containing at least six chlorine atoms per molecule. Such highly chlorinated compounds are crystalline solids, and are distinguishable from other chlorinated diphenyl oxide products by melting in a range of about 131.5 to 137° C. They crystallize and separate out from liquid chlorinated diphenyl oxide compositions. Surprisingly, such solid compounds will function as congelation depressors for chlorinated hydrocarbon of unlike compositions even though they separate as solids from otherwise liquid compositions.

When diphenyl oxide is chlorinated in accordance with known methods, preferably in the range of 100 to 200° C., and preferably with the aid of a catalyst of iron, aluminum, or their chlorides, chlorinated products are produced of which the lower chlorination range are liquids of low viscosity. Such products are progressively more viscous as the chlorine content is increased. Eeventually highly chlorinated products result which are solid resins at ordinary temperatures.

When the combined chlorine corresponds generally to that of the hexachlor compound (56% chlorine), the chlorination product is a viscous liquid. A crystalline solid will separate upon standing from this viscous liquid. This crystalline solid product contains at least as much as 56 per cent and commonly about 60 to 61.5 per cent of chlorine.

It may be purified by known chemical means such as crystallization, distillation—preferably under reduced presure. If necessary to remove acidic products, it is treated with dilute alkali. To obtain the best electrical properties, the compositions containing this product may be treated with dry fuller's-earth or equivalent absorbent by known method. Such solid chlorination product has a melting point of about 131.5 to 137° C. when substantially free from products of lower chlorine content. The crystalline chlorinated diphenyl oxide may be purified by solution in a suitable solvent, such as trichlorbenzene. The solution is either concentrated by evaporation or is chilled to a sufficiently low temperature to cause crystallization from the solution of a solid chlorination product of diphenyl oxide.

Although the quantity of combined chlorine may be varied over a considerable range with a minimum of approximately 56 per cent, I prefer to employ a material containing about 60 to 61.5 per cent of chlorine. A product containing this amount of chlorine has a melting point in the range of 131.5 to 137° C. It is soluble in trichlorbenzene to the amount of about 5 to 10 per cent at a temperature of 0° C.

The characteristics of the highly chlorinated, solid diphenyl oxide composition, which is obtained as described, are as follows:

Melting point_____ 131.5 to 137° C.
Boiling range at 1 mm. pressure___ 185 to 230° C.
Condition at 25° C._____ While, crystalline solid
Reaction_____ Neutral
Specific gravity at 100° C_____ 1.590
Refractive index at 25° C_____ 1.6359
Dielectric constant at 100° C_____ 3.25
Dielectric constant at 25° C_____ 3.50

Surprisingly, such crystalline products function well as crystallization inhibitors or depressors for various chlorinated compositions.

The following tabulation will indicate the effect of crystalline chlorinated diphenyl oxide on the crystallizing characteristics at low temperatures of a mixture consisting of 60 parts chlorinated diphenyl (60% chlorine content) and 40 parts trichlorbenzene. The viscosity is given in Saybolt seconds.

| Days at −25° C. | No addition | | Percentages of depressor added | | | | | |
|---|---|---|---|---|---|---|---|---|
| | | | 1% | | 5% | | 10% | |
| | C | V | C | V | C | V | C | V |
| 1 | Clear | 13,520 | Clear | 13,000 | Clear | 16,000 | Clear | 27,000 |
| 2 | 1% cryst | 14,000 | 1% cryst | 15,000 | ----do---- | 19,000 | ----do---- | 30,000 |
| 3 | 3% cryst | 16,000 | 2% cryst | 16,000 | ----do---- | 19,000 | ----do---- | 30,000 |
| 6 | 25% cryst | | 20 cryst | | ----do---- | 19,000 | ----do---- | 30,000 |
| 8 | Solid | | 80% cryst | | ----do---- | 19,000 | ----do---- | 30,000 |

In this table the crystallinity, or lack of it, is indicated under heading C and the viscosity is indicated under the heading V.

As indicated in the table, the addition of even 1 per cent of crystalline chlorinated diphenyl oxide has some effect in reducing the formation of crystals at −25° C. The addition of 5% upward of the diphenyl oxide product wholly prevents congelation at −25° C. The electrical properties of such compositions are good. A mixture consisting of 54 per cent chlorinated diphenyl (containing 60% chlorine), 36 per cent trichlorbenzene and 10 per cent of solid, highly chlorinated diphenyl oxide has under 60 cycles test at 25° C. a power factor of .25 to .30 per cent, dielectric strength of about 45 kilovolts, when tested with $\frac{1}{10}$ inch gap, and an electrical resistivity at least as high as $24.6 \times 10^{12}$ ohms per cm$^3$. Capacitors containing kraft paper spacers impregnated with such a composition operate at 25° C. with a power factor of about .3 per cent, and operate at 100° C. with a power factor of .6 per cent or lower.

Electric devices, such as transformers, capacitors and the like, when provided with a liquid insulating or dielectric material under conditions of normal use, should have such insulating material continuously maintained in the liquid state. Even partial solidification of the material is accompanied by the evolution of dissolved gases from the liquid, a drop in dielectric strength, higher electric losses, and in general a depreciation of dielectric properties. Partial or complete solidification of a cooling and insulating liquid in transformers prevents adequate cooling of the transformer and may lead to localized over-heating which results in damage or even complete destruction. In some cases transformers containing such a liquid insulating material are installed unsheltered out-of-doors, and are subjected to the extremes of winter temperatures. Should the dielectric in such a transformer during a period of idleness become wholly or partly solidified and a normal load should be thrown upon the transformer without first liquefying such insulating material, then serious damage or even destruction of the transformer may result.

Although in the foregoing I have illustrated my invention with particular reference to lowering of congelation temperature of a liquid composition, my invention is not restricted only to liquid compositions. As described and claimed in a copending application Serial No. 452,801, filed concurrently therewith, crystalline chlorinated diphenyl benzene also is useful for the modification of solidification characteristics of various normally solid materials. Diphenyl benzene when combined with about 60 per cent chlorine is a brittle, glass-like solid. While it has good dielectric properties, it does not readily adhere well to the surface of metals and because of its brittleness cracks easily, thereby opening fissures through which moisture easily penetrates.

When with such a composition of glass-like hardness and brittleness there is blended a solid, highly chlorinated diphenyl oxide which itself is a hard, brittle, crystalline material of poor waterproofing characteristics, then compositions are formed which are non-brittle and possess good waterproofing properties. For some ranges of composition these new blends are soft, sticky, semi-solids at 25° C. which are useful in potheads, cable joints, bushings and the like. For example, a composition consisting of equal parts of hard, brittle chlorinated diphenyl benzene and hard, brittle chlorinated diphenyl oxide is at 25° C. a relatively soft, resinous solid. Whereas the melting point of chlorinated diphenyl benzene is about 95 to 105° C. and the melting point of the highly chlorinated diphenyl oxide is in the range of 131.5 to 137° C., the flow point of such an equal parts mixture is about 50° C. The viscosity of such an equal parts mixture at 110° C. is 343 Saybolt seconds and at 130° C. is 111 Saybolt second. The specific gravity at 100° C. (referred to water at 15.5° C.) is 1.576. At 130° C./15.5° C. the specific gravity is 1.555.

A mixture consisting of 75 parts by weight of chlorinated diphenyl benzene and 25 parts by weight of highly chlorinated diphenyl oxide is a soft, sticky, semi-solid having a flow point of about 78° C.

It appears paradoxical that insulating compositions consisting in large part of trichlorbenzene, a solvent from which the solid, crystalline chlorinated diphenyl oxide product above described was originally crystallized, should have their congealing temperature materially decreased by the addition of such chlorinated diphenyl oxide product. It is suggested that an unexplainable chemical or physical combination occurs between the diphenyl oxide product and the diphenyl component in the nature of an alloy eutectic.

While I have described herein several mixtures comprising diphenyl or a derivative thereof in a chlorinated state associated with chlorinated diphenyl oxide, it should be understood that various other diphenyl derivatives may be similarly associated with such diphenyl compound, for example, chlorinated diphenyl methane, chlorinated diphenyl ketone or chlorinated alkyl derivatives of diphenyl. Collectively such compounds are aromatic hydrocarbons having a plurality of uncondensed benzene nuclei.

Enamelled wire and varnished cloth, such as commonly used in the electrical industry, are not attacked by the described compositions when in contact therewith at ordinary operating temperatures.

Although my invention has been described with particular reference to chlorinated compounds, it should be understood that the substitution of other halogens for chlorine is not to be excluded.

What I claim as new and desire to secure by Letters Patent of the United States is:

1. A composition which is suitable for electrical insulating purposes and which is soft and semi-solid at 25° C. comprising the combination by weight of about 50 to 75 parts of crystalline chlorinated diphenyl benzene and about 50 to 25 parts of crystalline chlorinated diphenyl oxide, containing about 60 per cent chlorine and melting in the range of 131 to 137° C.

2. A composition which is suitable for electrical insulating purposes comprising by weight substantially equal parts of crystalline chlorinated diphenyl benzene containing about 60 per cent chlorine and crystalline chlorinated diphenyl oxide containing at least about 60 per cent chlorine, said composition having a flow point of about 50° C. and a viscosity at 110° C. of about 343 seconds Saybolt.

3. The method of preventing the formation of crystals at −25° C. in a liquid composition consisting of about 60 parts of chlorinated diphenyl of 60 per cent chlorine content and 40 parts of trichlorbenzene which consists in adding thereto about 5 to 10 per cent of crystalline chlorinated diphenyl oxide which has a melting point of about 131 to 137° C.

4. A non-crystalline composition which is suitable for electrical insulating purposes and consisting to the extent of at least 50 per cent of aromatic hydrocarbons having a plurality of uncondensed benzene nuclei which are approximately 60 per cent chlorinated, in combination with no less than about 5 per cent of solid crystalline chlorinated diphenyl oxide which is derived from non-crystalline viscous hexachlor diphenyl oxide, which melts in the range of about 131 to 137° C. and contains about 60 per cent chlorine.

5. A liquid composition which is non-crystal forming at temperatures as low as −25° C. and is suitable for electric insulating purposes comprising a mixture of chlorinated aryl compounds having a plurality of uncondensed nuclei, the preponderant ingredient being chlorinated diphenyl, said composition containing about 5 to 10 per cent of solid crystalline chlorinated diphenyl oxide which melts in the range of about 130 to 137° C. and is derived from non-crystalline viscous liquid hexachlor diphenyl oxide.

6. A liquid composition consisting of substantially about 54 to 60 parts of chlorinated diphenyl of 60 per cent chlorine content, about 36 to 40 parts of trichlorbenzene and about 5 to 10 parts of crystalline chlorinated diphenyl oxide which has a melting point of about 131 to 137° C.

FRANK M. CLARK.